United States Patent
Nishioka

(10) Patent No.: US 7,898,911 B2
(45) Date of Patent: Mar. 1, 2011

(54) OPTICAL PICKUP APPARATUS EQUIPPED WITH A LENS ANGLE ADJUSTING MEMBER AND A SEMICONDUCTOR LASER ELEMENT

(75) Inventor: Ken Nishioka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1265 days.

(21) Appl. No.: 11/485,792

(22) Filed: Jul. 13, 2006

(65) Prior Publication Data
US 2007/0014210 A1    Jan. 18, 2007

(30) Foreign Application Priority Data
Jul. 15, 2005    (JP) .............................. 2005-207008

(51) Int. Cl.
*G11B 7/00* (2006.01)
*G02B 7/02* (2006.01)

(52) U.S. Cl. .................. 369/44.32; 369/44.15; 359/822

(58) Field of Classification Search ........... 359/236, 359/433, 822; 720/681; 369/44.17, 44.23
See application file for complete search history.

(56) References Cited

U.S. PATENT DOCUMENTS

| | | | |
|---|---|---|---|
| 5,623,466 A * | 4/1997 | Itonaga ............... | 369/44.32 |
| 5,689,378 A * | 11/1997 | Takashima et al. .......... | 359/813 |
| 6,198,580 B1 * | 3/2001 | Dallakian ............... | 359/822 |
| 6,418,108 B1 | 7/2002 | Ueda et al. | |
| 6,542,319 B2 * | 4/2003 | Kato et al. ............ | 359/822 |
| 6,992,843 B2 * | 1/2006 | Juhala ............... | 359/819 |
| 7,184,218 B1 * | 2/2007 | Berman et al. ........... | 359/649 |
| 7,518,965 B2 * | 4/2009 | Kataoka ............... | 369/53.19 |
| 2003/0161249 A1 | 8/2003 | Kamisada et al. | |
| 2005/0002289 A1 | 1/2005 | Mori | |

FOREIGN PATENT DOCUMENTS

| | | |
|---|---|---|
| CN | 1124392 | 6/1996 |
| CN | 1180886 | 5/1998 |
| JP | 6-168456 | 6/1994 |
| JP | 8-147747 | 6/1996 |

OTHER PUBLICATIONS

Patent Abstracts of Japan, Publication No. 08-147747, Publication Date: Jun. 7, 1996, 1 page.
Japanese Office Action for Application No. 2005207008, mailed on Mar. 3, 2009 (5 pages).
Patent Abstract of Japan for Japanese Publication No. 06-168456, publication date Jun. 14, 1994 (1 page).
Extended European Search Report for European Application No. 06014577.8-2210, mailed on Oct. 31, 2008 (6 pages).

* cited by examiner

*Primary Examiner*—Hoa T Nguyen
*Assistant Examiner*—Mark L Fischer
(74) *Attorney, Agent, or Firm*—Osha • Liang LLP

(57) ABSTRACT

In an optical pickup apparatus, a collimator lens is rockably supported by edges of two protruding portions formed on opposing sides of a groove of an optical base. The collimator lens is urged against the edges of the two protruding portions by a leaf spring. The position in vertical direction of one end of the leaf spring is adjusted by a position adjustor. In this manner, a tilt angle of the collimator lens is adjusted. Therefore, astigmatism of the light spot can precisely be compensated for irrespective of variations among apparatuses to achieve an excellent light spot.

1 Claim, 11 Drawing Sheets

OPTICAL PICKUP APPARATUS EQUIPPED WITH A LENS ANGLE ADJUSTING MEMBER AND A SEMICONDUCTOR LASER ELEMENT

BACKGROUND OF THE INVENTION

1. Field of the Invention

The present invention relates to an optical pickup apparatus, and particularly, to an optical pickup apparatus for an optical disc using a semiconductor laser element.

2. Description of the Background Art

Conventionally, an optical pickup apparatus employing a semiconductor laser element has been used as an apparatus for recording and reproducing a signal on an optical disc. With the optical pickup apparatus, laser diffusion light emitted from the semiconductor laser element is converted into parallel light by a collimator lens and collected on the optical disc by an objective lens.

However, there has been a problem with the conventional optical pickup apparatus that an astigmatic difference of the semiconductor laser element causes astigmatism in a light spot on the optical disc, whereby an excellent light spot cannot be attained.

Accordingly, a method has been proposed, wherein a collimator lens is arranged to be tilted by a prescribed angle with respect to the direction perpendicular to an optical axis, so that the astigmatism caused by the astigmatic difference of the semiconductor laser element is compensated for by astigmatism obtained by the tilt arrangement of the collimator lens (for example, see Japanese Patent Laying-Open No. 8-147747).

However, there has been a problem with the conventional method that the astigmatism that varies depending on apparatuses cannot precisely be corrected for because of the fixed tilt angle of the collimator lens, and that an excellent light spot cannot be attained.

SUMMARY OF THE INVENTION

Accordingly, a main object of the present invention is to provide an optical pickup apparatus that can attain an excellent light spot.

An optical pickup apparatus according to the present invention has a collimator lens converting laser diffusion light emitted from a semiconductor laser element into parallel light. The collimator lens is arranged to be tilted with respect to a direction perpendicular to an optical axis. An astigmatic difference of the semiconductor laser element is corrected for by astigmatism generated by the tilt arrangement. The optical pickup apparatus includes a support member rockably supporting the collimator lens to rotate about a line perpendicular to the optical axis. The support member including an optical base where a groove for insertion of the collimator lens is formed, where a through hole for passage of the optical axis is opened at a central portion of a bottom of the groove, and where a peripheral portion of the collimator lens is received with first and second protruding portions formed on opposing sides of the through hole and a third protruding portion formed on one side of the line at the bottom of the groove. The line perpendicular to the optical axis passes through edges of the first and second protruding portions, wherein a reference surface is formed at the bottom of the groove on the one side of the line and a tilt surface intersecting with the reference surface at a prescribed angle is formed at the bottom of the groove on an other side of the line. A stopper abutting on a circumferential surface of the collimator lens for positioning a center of the collimator lens at the optical axis is convexly provided on the one side of the line at the bottom of the groove. The optical pickup apparatus further includes a lens angle adjusting portion for adjusting a tilt angle of the collimator lens with respect to the direction perpendicular to the optical axis. The lens angle adjusting portion includes: a leaf spring that is arranged in a direction perpendicular to both the optical axis and the line, that has an end on the reference surface side fixed, and that urges the collimator lens against the first and second protruding portions; first and second spacers respectively provided between the leaf spring and an end of the collimator lens on the reference surface side and between the leaf spring and an end of the collimator lens on the tilt surface side; and a position adjustor adjusting a position of the end of the leaf spring on the tilt surface side in a direction of the optical axis to adjust a tilt angle of the collimator lens.

With the optical pickup apparatus according to the present invention, the tilt angle of the collimator lens can be adjusted by adjusting the position of the end of the leaf spring on the tilt surface side by the position adjustor. Therefore, even when astigmatism varies-depending on apparatuses, the astigmatism can precisely be compensated for by adjusting the tilt angle of the collimator lens on the apparatus basis to achieve an excellent light spot.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
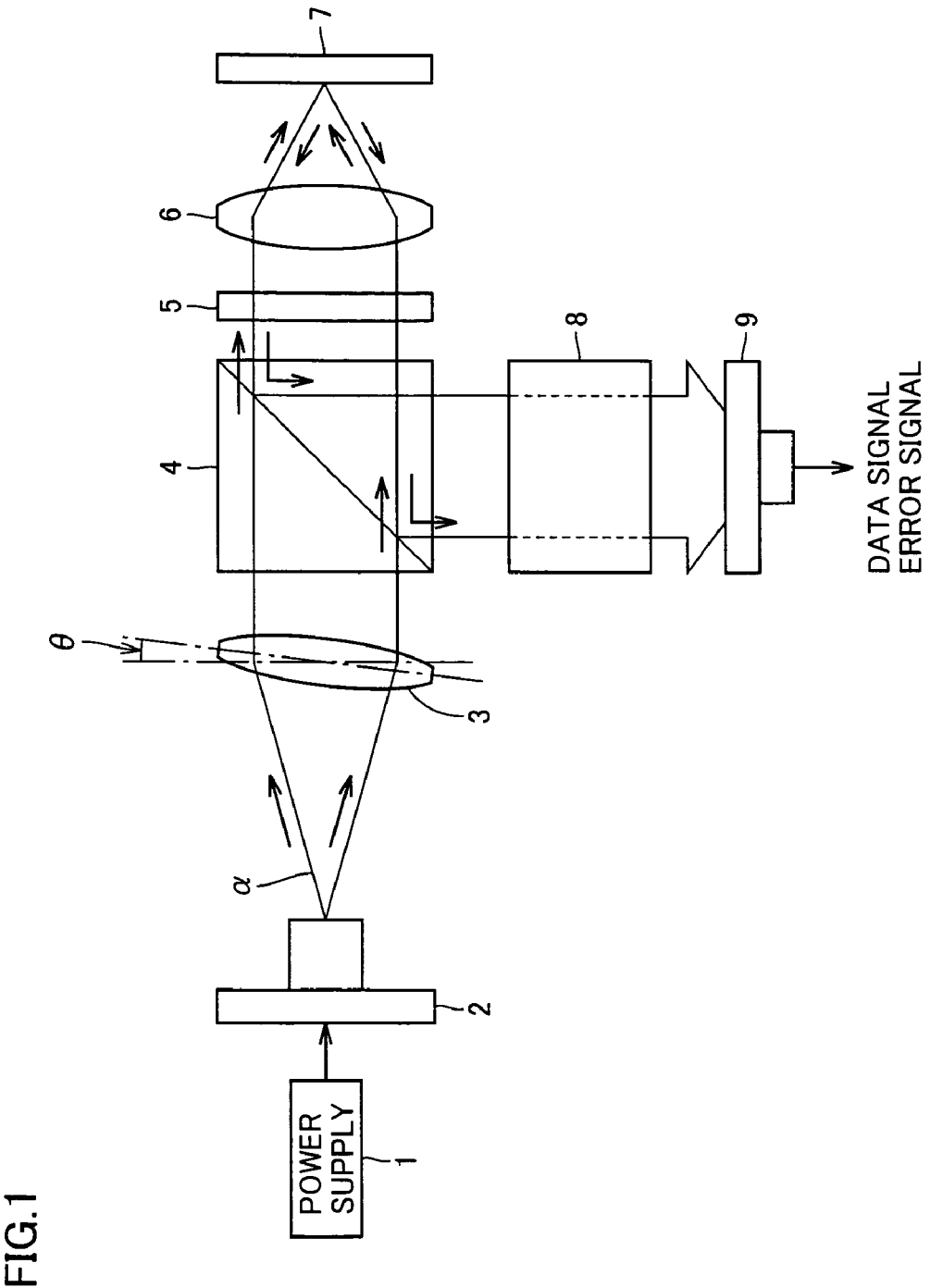
FIG. 1 shows an overall configuration of an optical pickup apparatus according to a first embodiment of the present invention.
Figure 2:
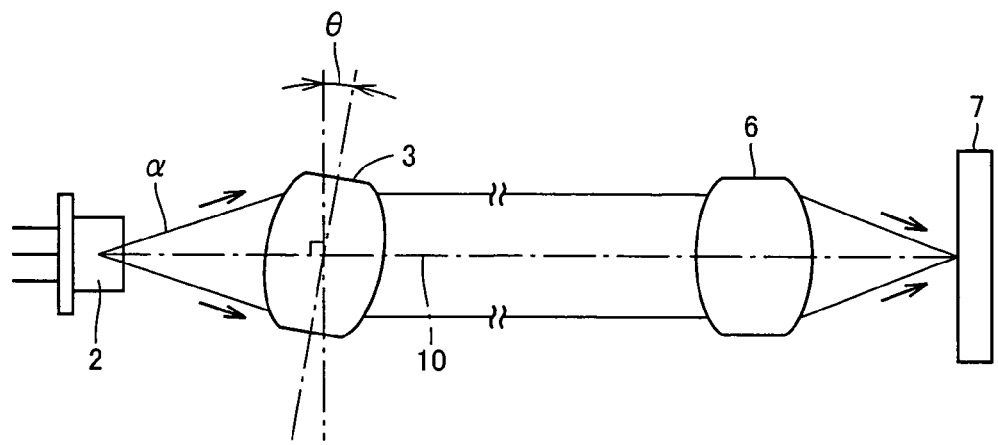
FIG. 2 shows a substantial part of the optical pickup apparatus shown in FIG. 1.

FIG. 1 shows an overall configuration of an optical pickup apparatus according to one embodiment of the present invention, and FIG. 2 shows a substantial part thereof Referring to FIGS. 1 and 2, the optical pickup apparatus includes a semiconductor laser element 2 such as a laser diode connected to a power supply 1. Laser diffusion light a emitted from semiconductor laser element 2 is converted into parallel light by a collimator lens 3.

Figure 3:
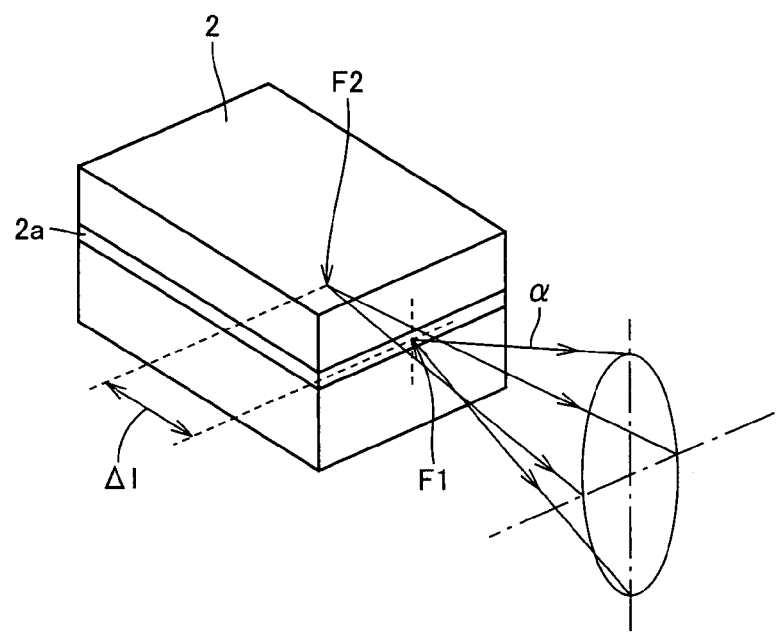
FIG. 3 is an illustration for describing an astigmatic difference of the semiconductor laser element shown in FIG. 1.

Here, semiconductor laser element 2 necessarily has an astigmatic difference due to its characteristics, which necessarily causes astigmatism on the focus plane of the laser light. FIG. 3 is an illustration for describing an astigmatic difference of semiconductor laser element 2. An active layer 2a generating laser diffusion light a of semiconductor laser element 2 has a small thickness and formed in a rectangular shape, whereby the focus position of laser diffusion light α varies on an optical axis between perpendicular and parallel directions with respect to active layer 2a. In FIG. 3, the focus for the laser light perpendicular to active layer 2a is denoted by Fl, and the focus for the laser light parallel to active layer 2a is denoted by F2. A distance Δ1 between those two focuses F1 and F2 is an astigmatic difference.

Accordingly, in the optical pickup apparatus, as shown in FIG. 2, a collimator lens 3 is arranged to be tilted by a prescribed angle θ with respect to the direction perpendicular to an optical axis 10, so that astigmatism caused by an astigmatic difference of semiconductor laser element 2 is compensated for.

Figure 4:
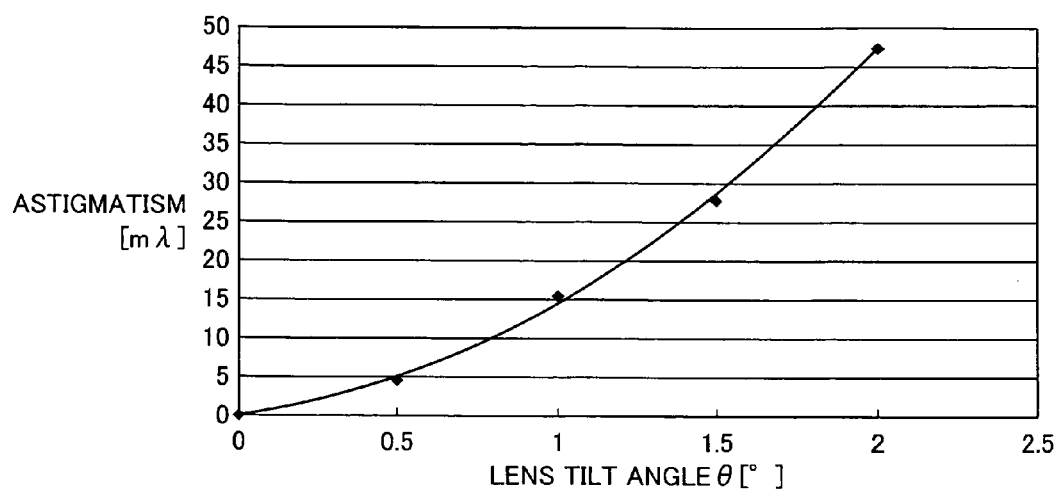
FIG. 4 shows the relationship between the tilt angle of the collimator lens shown in FIGS. 1 and 2 and the astigmatism.

That is, as shown in FIG. 4, as tilt angle θ of collimator lens 3 increases, an absolute value of the astigmatism increases as well. By such a tilt arrangement of collimator lens 3, astigmatism is generated in the reverse direction to the astigmatism occurred by semiconductor laser element 2, to thereby compensate for the astigmatism occurred by semiconductor laser element 2. For example, on occurrence of astigmatism where the focus position in the perpendicular direction with respect to active layer 2a of semiconductor laser element 2 is farther on an optical axis than the focus position in the parallel direction, in order to compensate for the astigmatism, collimator lens 3 is arranged to be tilted to provide astigmatism where the focus position in the perpendicular direction is nearer on the optical axis than the focus position in the parallel direction.

Referring to FIG. 1 again, the laser light having passed through collimator lens 3 further passes through a polarization beam splitter 4 and a ¼ wave plate 5 to be introduced into an objective lens 6, where the parallel laser light is narrowed and focuses on the surface of an optical disc 7 to form a light spot. The laser light emitted on the surface of optical disc 7 is modulated by disc information and reflects. The reflected light is reflected by polarization beam splitter 4 in a 90° direction in the drawing, and thereafter passes through a detection optical device 8 to enter a photodiode 9, where the light is converted into a data signal or an error signal.

Figure 5A:
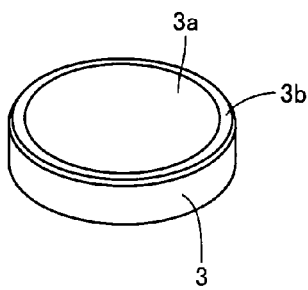
FIGS. 5A and 5B are perspective views showing a structure of an optical base supporting the collimator lens shown in FIGS. 1 and 2.
Figure 5B:
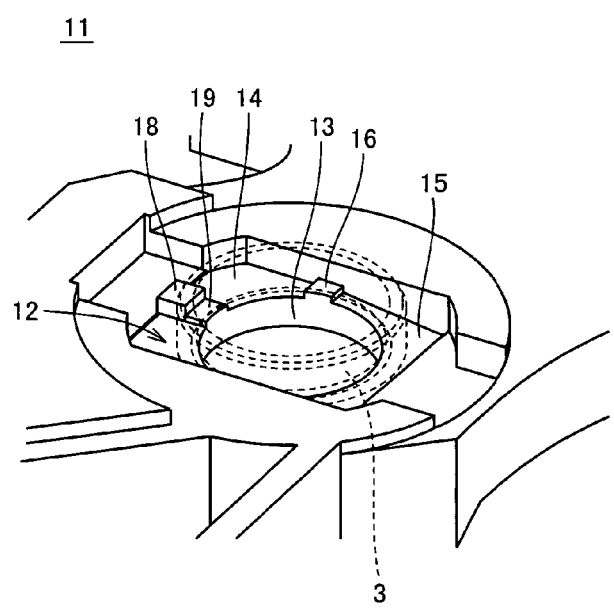
Figure 6A:
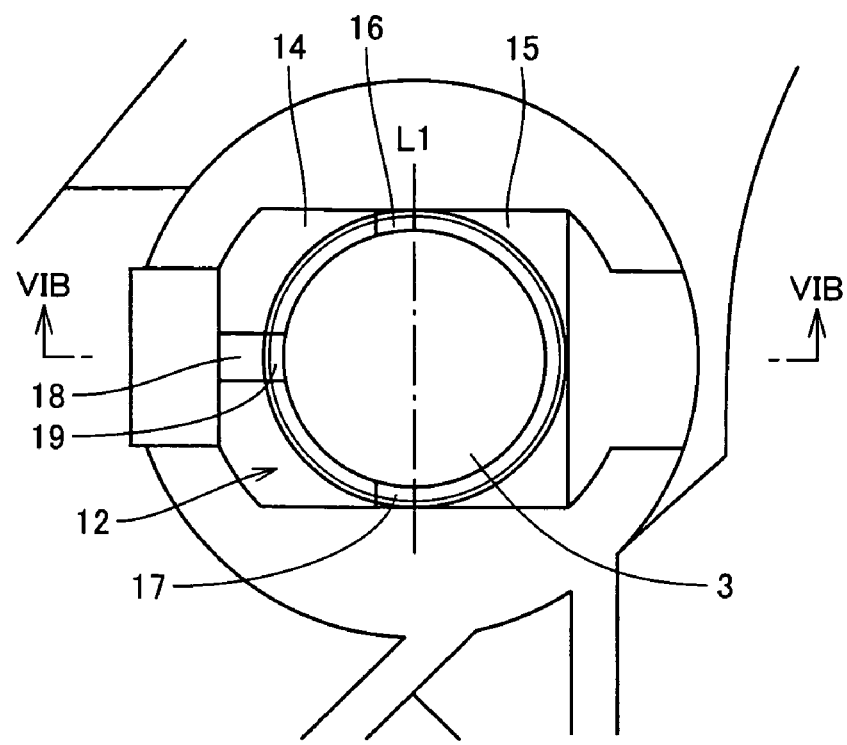
FIGS. 6A and 6B are plan views showing the structure of the optical base shown in FIGS. 5A and 5B.
Figure 6B:
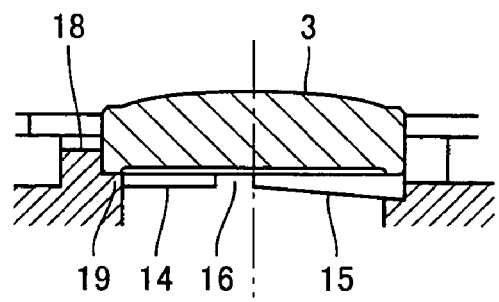

Next, a lens angle adjusting mechanism characterizing the optical pickup apparatus is described. FIGS. 5A and 5B are perspective views showing a structure of collimator lens 3 and optical base 11. FIG. 6A is plan view showing the structure of optical base 11. FIG. 6B is a cross-sectional view along VIB-VIB line in FIG. 6A.

Collimator lens 3 has a lens portion 3a and a cylindrical flange portion 3b provided at the circumference of lens portion 3a. At a prescribed position in optical base 11, a groove 12 is formed so that collimator lens 3 is inserted. The width of a central portion of groove 12 is set to be substantially the same as the diameter of collimator lens 3. At the center of the bottom of groove 12, a through hole 13 for allowing optical axis 10 to pass is provided. The diameter of through hole 13 is set to be substantially the same as that of lens portion 3a of collimator lens 3. Accordingly, a lower end surface of flange portion 3b that is the circumference of collimator lens 3 is supported by the surrounding portion around through hole 13.

A reference surface 14 is formed at the bottom of groove 12 on one side (left side in FIG. 6A) relative to line L1 that is perpendicular to the center line of through hole 13 (that is, optical axis 10) and extends in the width direction of groove 12. A tilt surface 15 is formed at the bottom of groove 12 on the other side (right side in FIG. 6A) relative to line L1. Reference surface 14 is arranged substantially perpendicular to optical axis 10. Tilt surface 15 becomes gradually lower with distance from reference surface 14. In other words, reference surface 14 and tilt surface 15 are disposed at a prescribed angle with respect to each other. In the bottom of groove 12, along the intersect line of reference surface 14 and tilt surface 15, a protruding portion 16 is provided on one side of through hole 13, and a protruding portion 17 is provided on the other side of through hole 13. Protruding portions 16, 17 each have an edge rockably supporting collimator lens 3. Line L1 passes through the edges of protruding portions 16, 17. Collimator lens 3 is rockably supported in a prescribed range of angle to rotate about the edges of protruding portions 16, 17 on the opposing sides of through hole 13 (that is, about line L1).

At a central portion on an upstream side of through hole 13 (reference surface 14 side), a stopper 18 for positioning the center of collimator lens 3 at the center of through hole 13 (that is, optical axis 10) is convexly provided. A circumferential surface of collimator lens 3 abuts on stopper 18. Collimator lens 3 inserted into groove 12 is positioned at three points of opposing internal walls of groove 12 and stopper 18. At reference surface 14 between stopper 18 and through hole 13, a protruding portion having the same height as protruding portions 16 and 17 is provided. Collimator lens 3 is supported horizontally by three protruding portions 16, 17 and 19.

Figure 7:
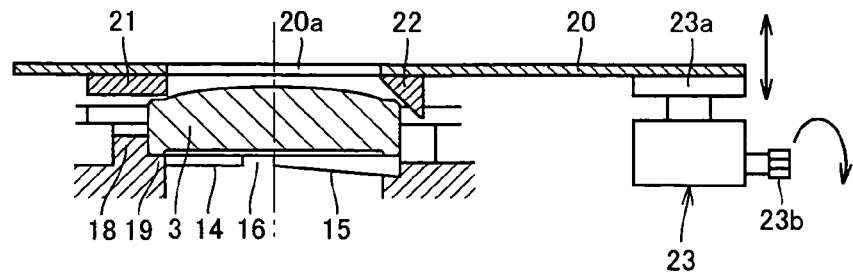
FIG. 7 shows a configuration of a leaf spring and a position adjustor adjusting the tilt angle of the collimator lens shown in FIGS. 1 and 2.

As shown in FIG. 7, a leaf spring 20 is arranged above collimator lens 3. Leaf spring 20 is arranged in a direction perpendicular to line L1 to urge collimator lens 3 against protruding portions 16, 17. A hole 20a for allowing optical axis 10 to pass is opened at a prescribed position of leaf spring 20. The end of leaf spring 20 on reference surface 14 side is fixed. At the bottom surface of leaf spring 20, spacers 21, 22 are adhered. Spacers 21, 22 are formed with Teflon, for example, so as to prevent leaf spring 20 from damaging collimator lens 3. Spacer 21 is formed in a plate-like shape, while spacer 22 is formed to have a cross section of a right triangle. The bottom end of spacer 21 is pressed against the end of collimator lens 3 on reference surface 14 side, while the hypotenuse surface of spacer 22 is pressed against the corner of collimator lens 3 on tilt surface 15 side. Thus, force is generated that causes collimator lens 3 to tilt toward tilt surface 15 side, rotating about line L1.

Figure 8A:
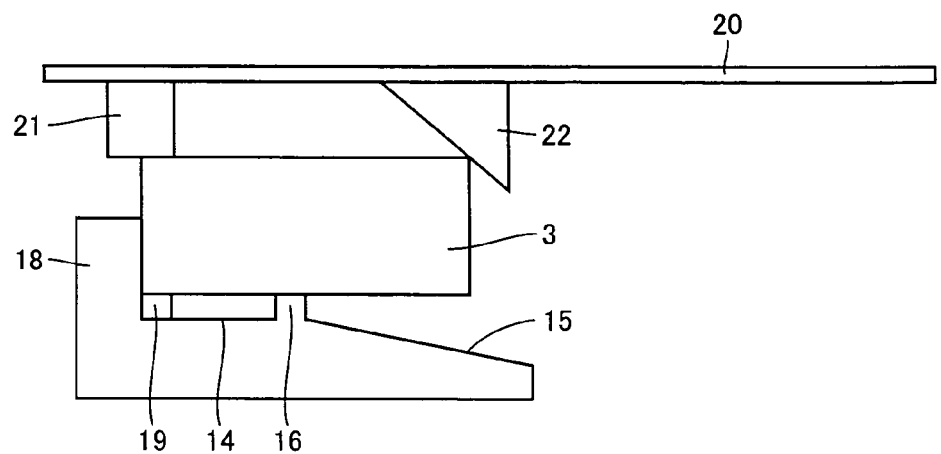
FIGS. 8A and 8B schematically show a method of adjusting the tilt angle of the collimator lens shown in FIGS. 1 and 2.
Figure 8B:
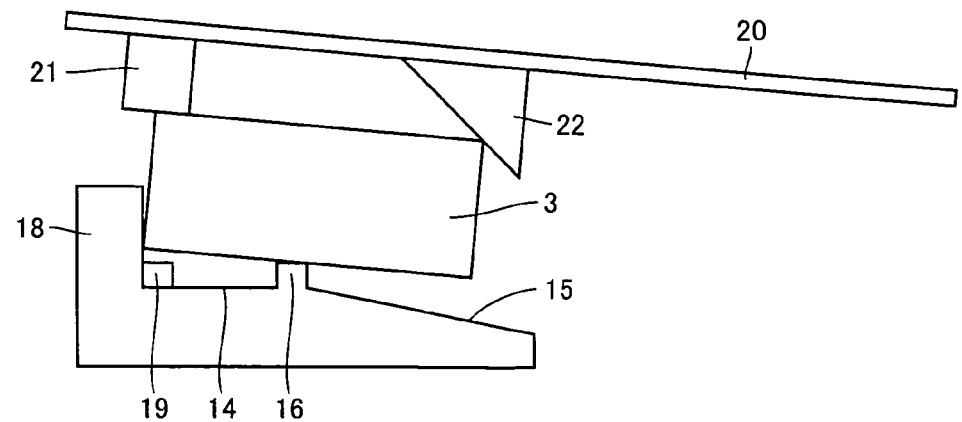

To the bottom surface of the end of leaf spring 20 on tilt surface 15 side, a movable portion 23a of a position adjustor 23 is fixed. By turning a position adjustment knob 23b of position adjustor 23, the position of movable portion 23a, that is, the end of leaf spring 20 on tilt surface 15 side, in the vertical direction can finely be adjusted. Changing the position in the vertical direction of the end of leaf spring 20 on tilt surface 15 side, tilt angle θ of collimator lens 3 changes. As shown in FIG. 8A, when the bottom surface of flange portion 3b of collimator lens 3 is parallel to reference surface 14, tilt angle θ of collimator lens 3 is substantially 0°. As shown in FIG. 8B, as the end of leaf spring 20 on tilt surface 15 side is moved lower, tilt angle θ of collimator lens 3 increases. The position of the end of leaf spring 20 on tilt surface 15 side is adjusted so that astigmatism of a light spot on optical disc 7 is minimized.

In the present first embodiment, tilt angle θ of collimator lens 3 can be adjusted. Therefore, even when astigmatism varies depending on apparatuses, the astigmatism can precisely be compensated for to achieve an excellent light spot.

Further, protruding portions 16, 17 are provided on the opposing sides at the bottom of groove 12, while collimator lens 3 inserted into groove 12 is urged against protruding portions 16, 17 by leaf spring 20. The position of one end of leaf spring 20 is adjusted by position adjustor 23. In this manner, tilt angle θ of collimator lens 3 is adjusted. Therefore, astigmatism can readily and quickly be compensated for with a small and simple configuration.

Figure 9A:
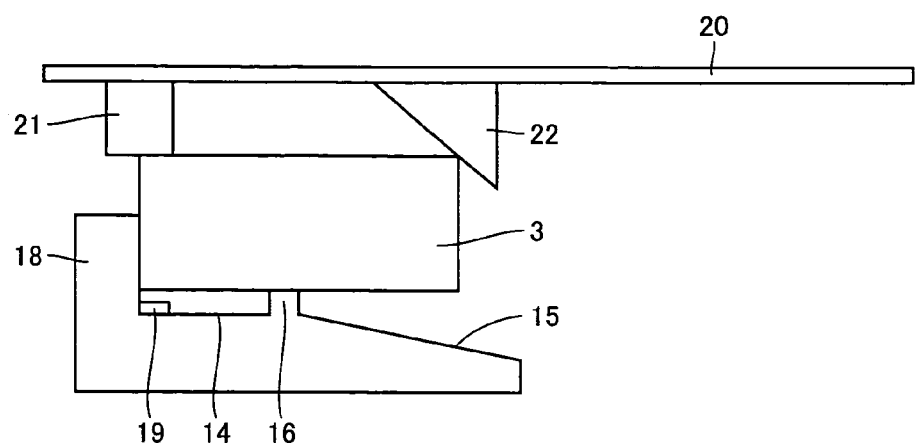
FIGS. 9A and 9B show a modification of the first embodiment.
Figure 9B:
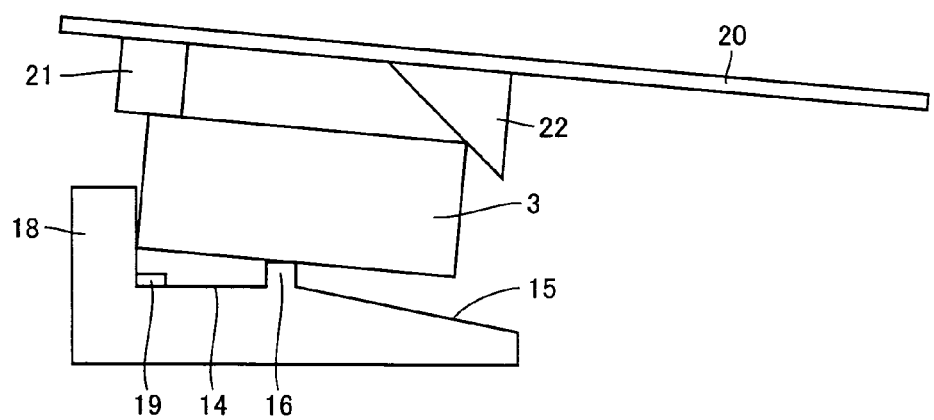
Figure 10A:
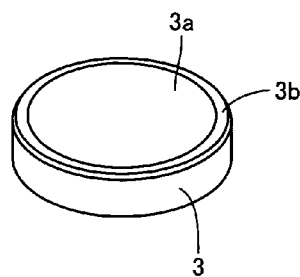
FIGS. 10A and 10B show another modification of the first embodiment.
Figure 10B:
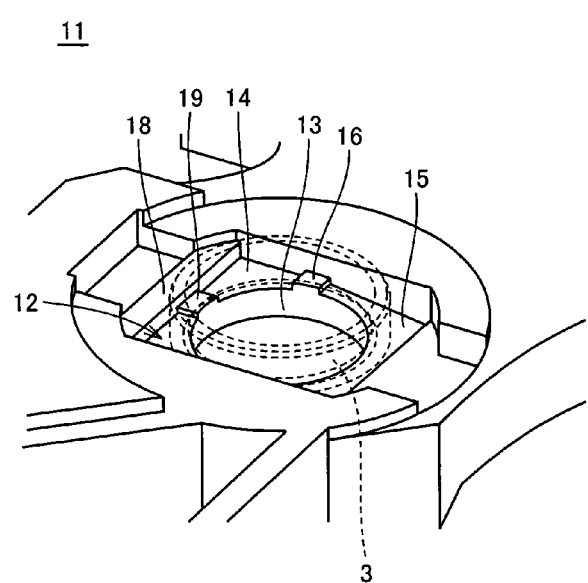

It is noted that, as shown in FIGS. 9A and 9B, protruding portion 19 may be formed to be lower than protruding portions 16 and 17. Additionally, as shown in FIGS. 10A and 10B, stopper 18 may be formed to be elongated in the width direction of groove 12.

Second Embodiment

Figure 11A:
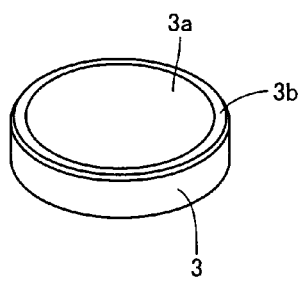
FIGS. 11A and 11B are perspective views showing a structure of an optical base according to a second embodiment of the present invention.
Figure 11B:
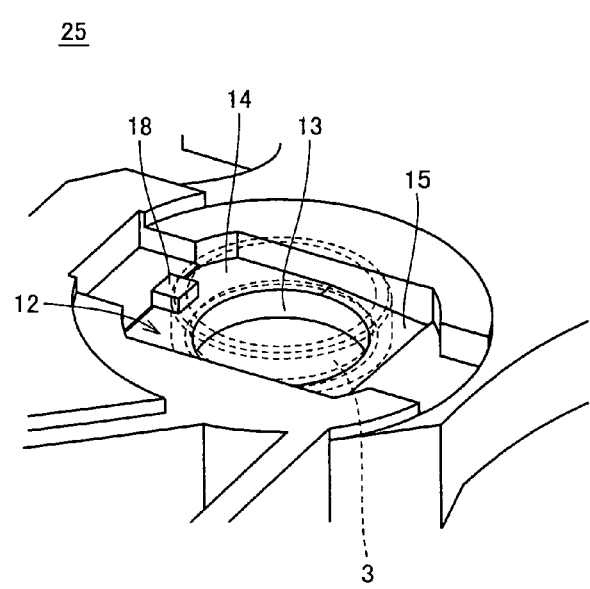
Figure 12A:
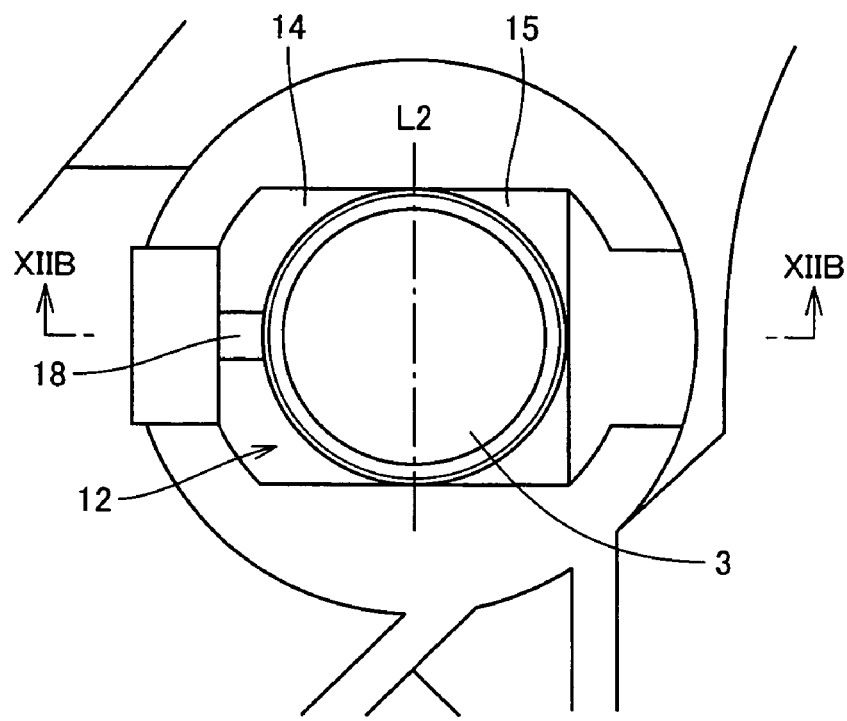
FIGS. 12A and 12B are plan views showing the structure of the optical base shown in FIGS. 11A and 11B.
Figure 12B:
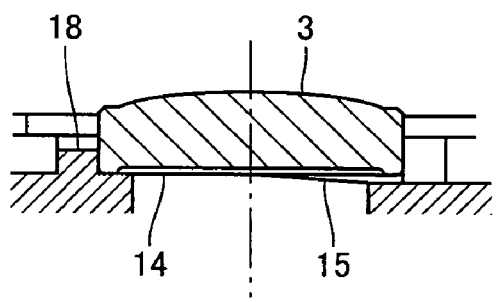

FIGS. 11A and 11B are perspective views showing a structure of a collimator lens 3 and an optical base 25 of an optical pickup apparatus according to a second embodiment of the present invention. FIG. 12A is a plan view showing a structure of optical base 25, and FIG. 12B is a cross-sectional view along XIIB-XIIB line in FIG. 12A.

Optical base 25 is different from optical base 11 of the first embodiment in that three protruding portions 16, 17 and 19 are removed.

Specifically, a reference surface 14 is formed at the bottom of groove 12 on one side (left side in FIG. 12A) relative to line L2 that is perpendicular to the center line of through hole 13 (that is, optical axis 10) and extends in the width direction of groove 12. A tilt surface 15 is formed at the bottom of groove 12 on the other side (right side in FIG. 12A) relative to line L2. Tilt surface 15 is lower on the other side than on the one side. In other words, reference surface 14 and tilt surface 15 are disposed at a prescribed angle with respect to each other, and line L2 includes the intersect line of reference surface 14 and tilt surface 15. Reference surface 14 is arranged substantially perpendicular to optical axis 10. Reference surface 14 and tilt surface 15 are arranged to form an angle that is greater than an assumed maximum value of tilt angle θ of collimator lens 3. Collimator lens 3 is rockably supported in a prescribed range of angle to rotate about the edges of intersecting portion of reference surface 14 and tilt surface 15 on the opposing sides of through hole 13 (that is, about line L2).

On one side of line L2, at a central portion of through hole 13, a stopper 18 is provided so that the center of collimator lens 3 is positioned at the center of through hole 13 (that is, optical axis 10). The circumferential surface of collimator lens 3 abuts on stopper 18. Collimator lens 3 inserted into groove 12 is positioned at three points of internal walls of opposing sides of groove 12 and stopper 18.

Figure 13:
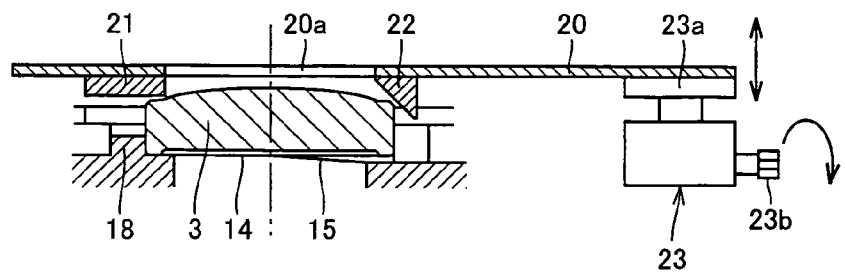
FIG. 13 shows a configuration of a leaf spring and a position adjustor adjusting the tilt angle of the collimator lens shown in FIGS. 11A, 11B, 12A, and 12B.

As shown in FIG. 13, a leaf spring 20 is arranged above collimator lens 3. To the bottom surface of leaf spring 20, spacers 21, 22 are adhered. The bottom end of spacer 21 is pressed against the end of collimator lens 3 on reference surface side 14, while the hypotenuse surface of spacer 22 is pressed against the corner of collimator lens 3 on tilt surface 15 side. Thus, force is generated that causes collimator lens 3 to tilt toward tilt surface 15 side rotating about line L2.

Figure 14A:
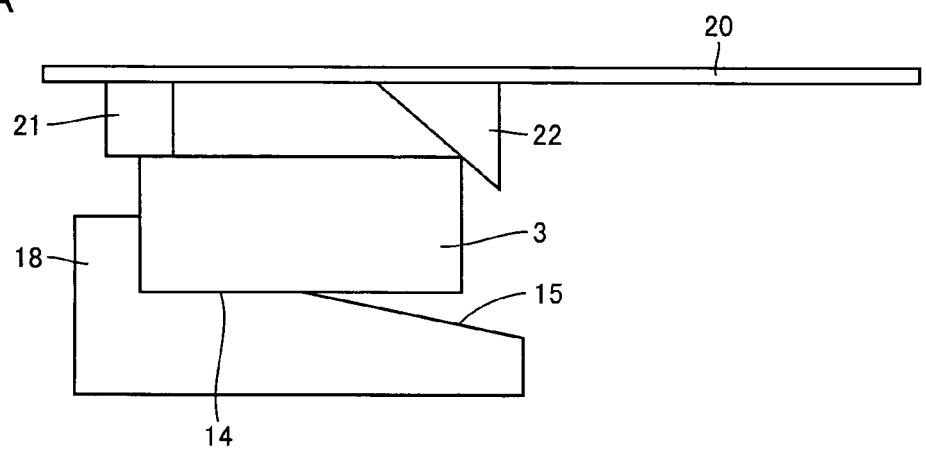
FIGS. 14A and 14B schematically show a method of adjusting the tilt angle of the collimator lens shown in FIGS. 11A, 11B, 12A, and 12B.
Figure 14B:
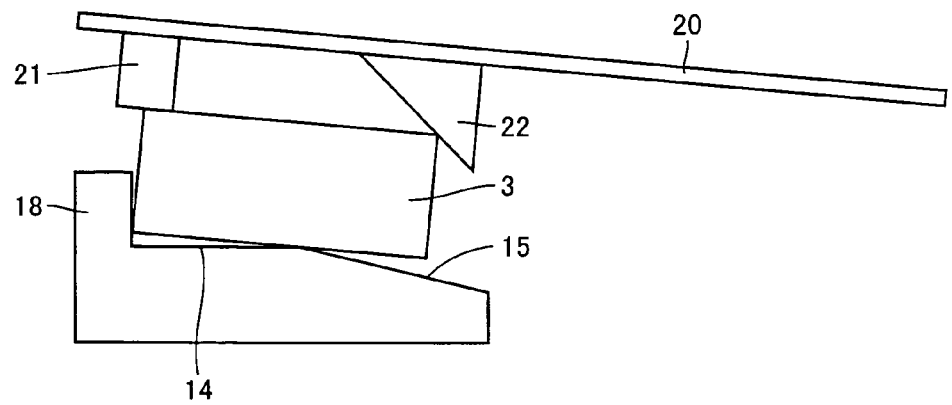

To the bottom surface of the end of leaf spring 20 on tilt surface 15 side, movable portion 23a of a position adjustor 23 is fixed. By turning a position adjustment knob 23b of position adjustor 23, the position of movable portion 23a, that is, the end of leaf spring 20 on tilt surface 15 side, in the vertical direction can finely be adjusted. Changing the position in the vertical direction of the end of leaf spring 20 on tilt surface 15 side, tilt angle θ of collimator lens 3 changes. As shown in FIG. 14A, when the bottom surface of flange portion 3b of collimator lens 3 abuts on reference surface 14, tilt angle θ of collimator lens 3 is substantially 0°. As shown in FIG. 14B, as the end of spring 20 on tilt surface 15 side is moved lower, tilt angle θ of collimator lens 3 increases. The position of the end of spring 20 on tilt surface 15 side is adjusted so that astigmatism of a light spot on optical disc 7 is minimized.

In the present second embodiment, tilt angle θ of collimator lens 3 can be adjusted. Therefore, even when astigmatism varies depending on apparatuses, the astigmatism can precisely be compensated for to achieve an excellent light spot.

Further, reference surface 14 and tilt surface 15 are provided at the bottom of groove 12, while collimator lens 3 inserted into groove 12 is urged against the bottom of groove 12 by leaf spring 20. The position of one end of leaf spring 20 is adjusted by position adjustor 23. In this manner, tilt angle θ of collimator lens 3 is adjusted. Therefore, astigmatism can readily and quickly be compensated for with a small and simple configuration.

Third Embodiment

Figure 15C:
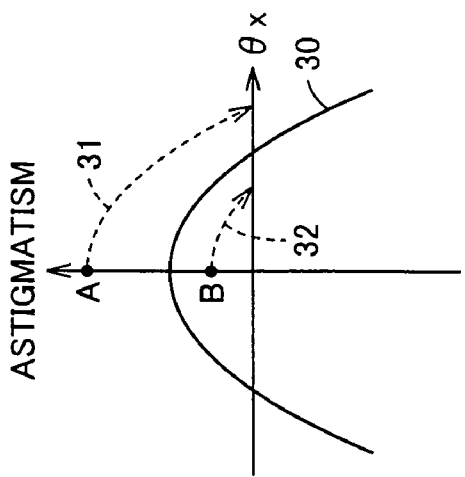
FIGS. 15A-15C are graphs for describing a method of adjusting the tilt angle of a collimator lens according to a third embodiment of the present invention.
Figure 15B:
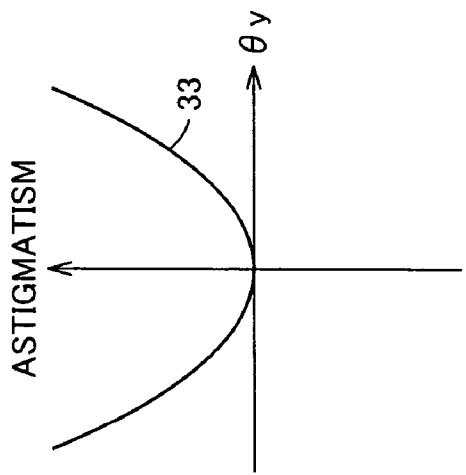
Figure 15A:
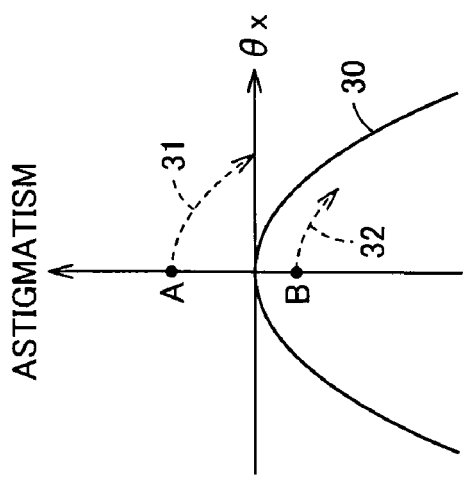
Figure 16A:
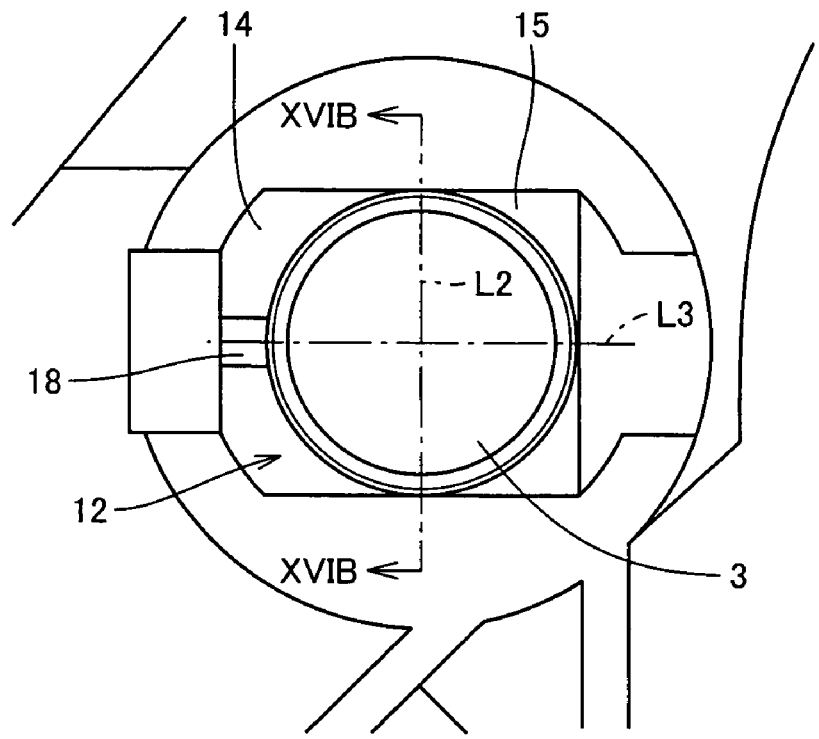
FIGS. 16A and 16B illustrate the method of adjusting the tilt angle of the collimator lens described referring to FIGS. 15A-15C.
Figure 16B:
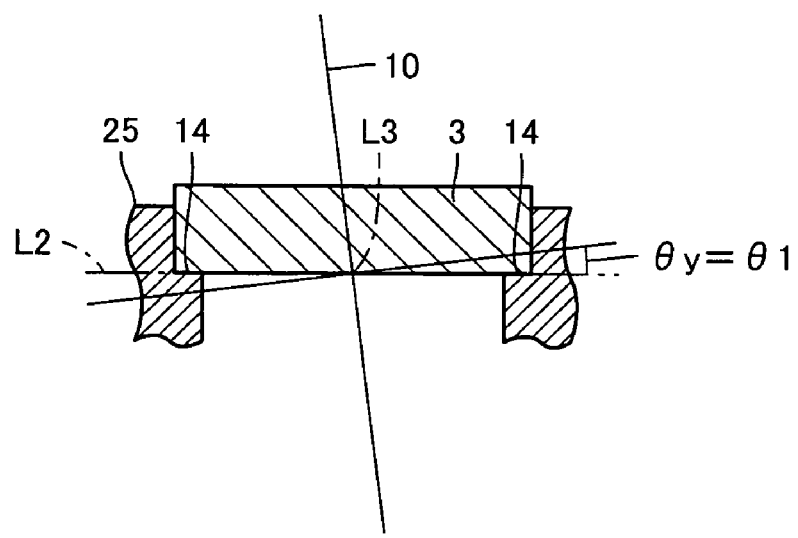

FIGS. 15A-15C are graphs indicative of the relationship between angles θx, θy formed by collimator lens 3 and optical axis 10 and astigmatism. Here, θx is an angle of collimator lens 3 with reference to the direction perpendicular to optical axis 10 when collimator lens 3 is tilted rotating about line L2 in FIG. 12A. θy is, as shown in FIGS. 16A and 16B, an angle of collimator lens 3 with reference to the direction perpendicular to optical axis 10 when collimator lens 3 is tilted rotating about a line L3 perpendicular to line L2 in FIG. 12A and optical axis 10.

In a state where an astigmatic distance of a semiconductor laser element 2 is 0, when tilt angle θx of collimator lens 3 rotating about line L2 in FIG. 12A is changed, astigmatism by the tilt arrangement of collimator lens 3 takes on the maximum value of 0 when θx=0, as shown by a solid curve 30 in FIG. 15A. Increasing θx positively or negatively, astigmatism increases negatively.

Now, it is assumed that the astigmatic difference of semiconductor laser element 2 is a positive value, and that astigmatic is at point A in FIG. 15A when tilt angle θ of collimator lens 3 is 0. Causing collimator lens 3 to gradually tilt toward tilt surface 15 side to gradually increase θx, the astigmatism gradually decreases as indicated by dashed curve 31 in FIG. 15A. Accordingly, by setting θx to an appropriate value, the astigmatism can be set to 0.

However, when the astigmatic difference of semiconductor laser element 2 is a negative value and that astigmatic is at point B in FIG. 15A, the astigmatism gradually decreases as indicated by dashed line 32 in FIG. 15A as θx is gradually increased, and the astigmatism cannot be set to 0.

On the other hand, in a state where an astigmatic distance of a semiconductor laser element 2 is 0, when tilt angle θy of collimator lens 3 rotating around line L3 perpendicular to both line L2 and the optical axis 10 in FIG. 12A is changed, astigmatism by the tilt arrangement of collimator lens 3 takes on the minimum value of 0 when θy=0, as shown by a solid curve 33 in FIG. 15B. Increasing θy positively or negatively, astigmatism increases positively.

Therefore, in the present third embodiment, as shown in FIGS. 16A and 16B, collimator lens 3 is arranged to be tilted by a prescribed angle θy=θ1 to rotate about line L3 perpendicular to line L2 and optical axis 10 in FIG. 12A. Thus, as shown in FIG. 15C, curves 30-31 shown in FIG. 15A can be level-shifted positively by a certain value. Accordingly, irrespective of the astigmatism being at point A or point B, it can be set to 0 by adjusting θx.

It goes without saying that the above-described first to third embodiments can be combined as appropriate.

It should be understood that the embodiments disclosed herein are illustrative and non-restrictive in every respect. The scope of the present invention is defined by the terms of the claims, rather than the description above, and is intended to include any modifications and changes within the scope and meaning equivalent to the terms of the claims.

What is claimed is:

1. An optical pickup apparatus comprising:
a collimator lens configured to convert laser diffusion light emitted from a semiconductor laser element into parallel light, said collimator lens being arranged to be tilted with respect to a direction perpendicular to an optical axis, an astigmatic difference of said semiconductor laser element being corrected for by astigmatism generated by the tilt arrangement;
a support member configured to rockably support said collimator lens to rotate about a line intersecting with said optical axis; and
lens angle adjusting means for adjusting a tilt angle of said collimator lens with respect to the direction perpendicular to said optical axis,
wherein said support member comprises an optical base where a through hole for passage of said optical axis is opened, and where a peripheral portion of said collimator lens is received with edges of two protruding portions formed on opposing sides of said through hole, and
wherein said line intersecting with said optical axis is perpendicular to said optical axis and passes through the edges of said two protruding portions;
wherein said lens angle adjusting means comprises:
a leaf spring that is arranged in a direction perpendicular to both said optical axis and said line, that has a fixed end, and that urges said collimator lens against said two protruding portions; and
a position adjustor adjusting a position of the other end of said leaf spring in a direction of said optical axis to adjust the tilt angle of said collimator lens.

* * * * *